(12) United States Patent
Zhong et al.

(10) Patent No.: US 11,892,874 B2
(45) Date of Patent: Feb. 6, 2024

(54) CASING ASSEMBLY

(71) Applicant: Getac Technology Corporation, New Taipei (TW)

(72) Inventors: Shi-Liang Zhong, Taipei (TW); Cheng-Hung Chiang, Taipei (TW)

(73) Assignee: GETAC TECHNOLOGY CORPORATION, New Taipei (TW)

( * ) Notice: Subject to any disclaimer, the term of this patent is extended or adjusted under 35 U.S.C. 154(b) by 0 days.

(21) Appl. No.: 18/196,511

(22) Filed: May 12, 2023

(65) Prior Publication Data
US 2023/0280787 A1 Sep. 7, 2023

Related U.S. Application Data

(62) Division of application No. 17/524,415, filed on Nov. 11, 2021, now Pat. No. 11,687,118.

(51) Int. Cl.
| | |
|---|---|
| *G06F 1/16* | (2006.01) |
| *G06F 1/18* | (2006.01) |
| *G06F 3/0354* | (2013.01) |

(52) U.S. Cl.
CPC .............. *G06F 1/1607* (2013.01); *G06F 1/16* (2013.01); *G06F 1/181* (2013.01); *G06F 3/03545* (2013.01); *G06F 2200/1632* (2013.01)

(58) Field of Classification Search
CPC .................................................. G06F 1/1626
See application file for complete search history.

(56) References Cited

U.S. PATENT DOCUMENTS

| | | | | |
|---|---|---|---|---|
| 5,757,681 A | * | 5/1998 | Suzuki ................. | G06F 1/1616 361/679.1 |
| 2006/0094464 A1 | * | 5/2006 | Kyou .................... | G06F 1/1626 455/556.1 |
| 2021/0247856 A1 | | 8/2021 | Wang et al. | |

FOREIGN PATENT DOCUMENTS

| | | |
|---|---|---|
| CN | 113391668 A | 9/2021 |
| TW | M589814 U | 1/2020 |
| (Continued) | | |

OTHER PUBLICATIONS

Office Action issued by (TIPO) Intellectual Property Office Ministry of Economic Affairs R.O.C. dated May 12, 2023 for Application No. 111141792, Taiwan.
(Continued)

*Primary Examiner* — Jerry Wu
(74) *Attorney, Agent, or Firm* — Locke Lord LLP; Tim Tingkang Xia, Esq.

(57) ABSTRACT

A casing assembly for accommodating a stylus includes a casing and a button. The casing has an accommodation recess and an opening in communication with each other. The accommodation recess has a first end and a second end opposite to each other on a longitudinal axis thereof, and accommodates the stylus. The opening extends from the first end to the second end. The button includes an operation portion and a pushing portion connected to each other. The operation portion is pivotally disposed at the casing so as to be pivotable between an initial position and a released position. The pushing portion is located in the accommodation recess. When the operation portion is pivoted from the initial position to the released position, the pushing portion in the accommodation recess is moved toward the opening so as to push the stylus out of the accommodation recess.

3 Claims, 8 Drawing Sheets

(56) References Cited

FOREIGN PATENT DOCUMENTS

TW          I706242 B    10/2020
TW      202132950 A    9/2021

OTHER PUBLICATIONS

EPO, "Extended European Search Report for EP Application No. 22205771.3", Hague, Germany, dated Mar. 31, 2023.

* cited by examiner

CASING ASSEMBLY

CROSS-REFERENCE TO RELATED PATENT APPLICATION

This non-provisional application is a Divisional Application of U.S. patent application Ser. No. 17/524,415, now allowed, the disclosure of which is incorporated herein in its entirety by reference.

BACKGROUND OF THE INVENTION

Field of the Invention

The present invention relates to a casing assembly and, more particularly, to a casing assembly for accommodating a stylus.

Description of the Prior Art

With the progress and development of technology, tablet computers are commonly used by people in the daily lives or for work. In general, a tablet computer may be used selectively with a stylus to perform operations such as writing, manipulating and drawing.

A current common tablet computer is provided with an accommodation recess for placing a stylus. When the stylus is not in use, the stylus may be stored in the accommodation recess and be prevented from being lost. In order to prevent the stylus stored from unexpectedly disengaging from the accommodation recess, the stylus is secured in the accommodation recess by a fixing means, and a user needs to pick the stylus by a finger in order to get the stylus out of the accommodation recess. However, if the stylus is secured too tightly in the accommodation recess, it may be difficult for the user to pick the stylus out of the accommodation recess. More particularly, when a user wears gloves, picking the stylus out of the accommodation recess by a finger may become even more difficult under the influence of the thickness of the gloves. Therefore, manufacturers of tablet computers are dedicated to improving such issue.

SUMMARY OF THE INVENTION

The present invention provides a casing assembly that allows a stylus to be easily taken out of an accommodation recess.

A casing assembly for accommodating a stylus is disclosed by an embodiment of the present invention. The casing assembly includes a casing and a button. The casing has an accommodation recess and an opening in communication with each other. The accommodation recess has a first end and a second end opposite to each other on a longitudinal axis thereof, and accommodates the stylus. The opening extends from the first end to the second end. The button includes an operation portion and a pushing portion connected to each other. The operation portion is pivotally disposed at the casing so as to be pivotable between an initial position and a released position. The pushing portion is located in the accommodation recess. When the operation portion is pivoted from the initial position to the released position, the pushing portion in the accommodation recess is moved toward the opening so as to push the stylus out of the accommodation recess.

A casing assembly for accommodating a stylus is further disclosed by another embodiment of the present invention. The casing assembly includes a casing and a button. The casing has a groove. The button is movably disposed in the groove of the casing so as to be movable between an initial position and a released position. The button has a pushing portion, and an accommodation recess and an opening that are in communication with each other. The accommodation recess has a first end and a second end opposite to each other on a longitudinal axis thereof, and accommodates the stylus. The opening extends from the first end to the second end. When the button moves from the initial position to the released position, the pushing portion approaches the opening from the accommodation recess so as to push the stylus out of the accommodation recess.

According to the casing assembly disclosed by the embodiments above, the pushing portion of the button is enabled to push the stylus out of the accommodation recess by operating the operation portion of the button. Thus, compared to a conventional approach of picking a stylus by a finger, the design of operating the button to withdraw the stylus from the accommodation recess provides a more convenient stylus pick-up operation. In particular, even when a user wears gloves, the user is still able to easily press the button to push the stylus out of the accommodation recess and then directly take the stylus.

The description related to the details of the present invention and the description of the embodiments below are examples for illustrating and explaining the principles of the present invention, and provide further interpretation with respect to the scope of claims of the present invention.

DETAILED DESCRIPTION OF THE EMBODIMENTS

Figure 1:
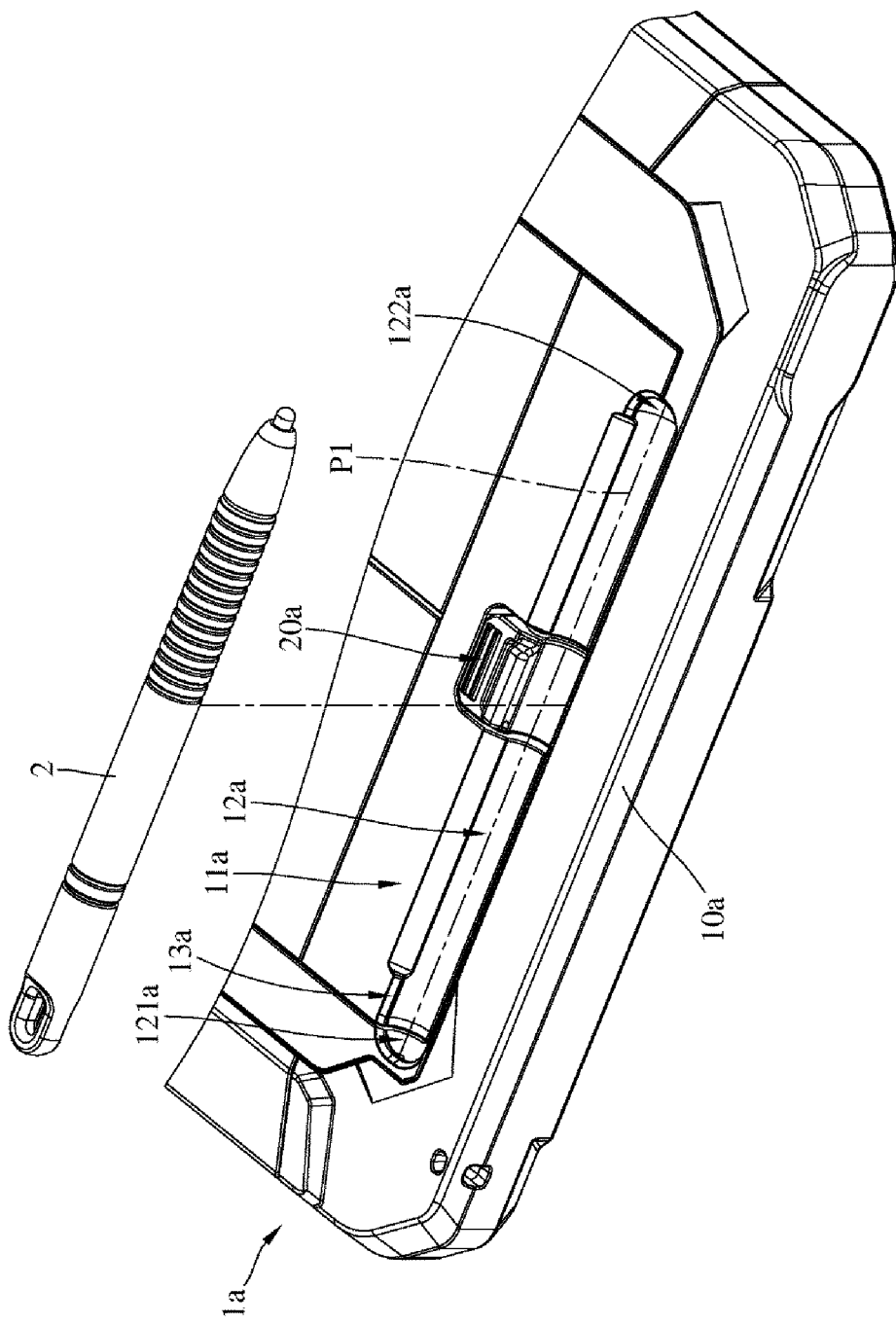
FIG. 1 is a three-dimensional schematic diagram of a casing assembly and a stylus disclosed according to a first embodiment of the present invention.
Figure 2:
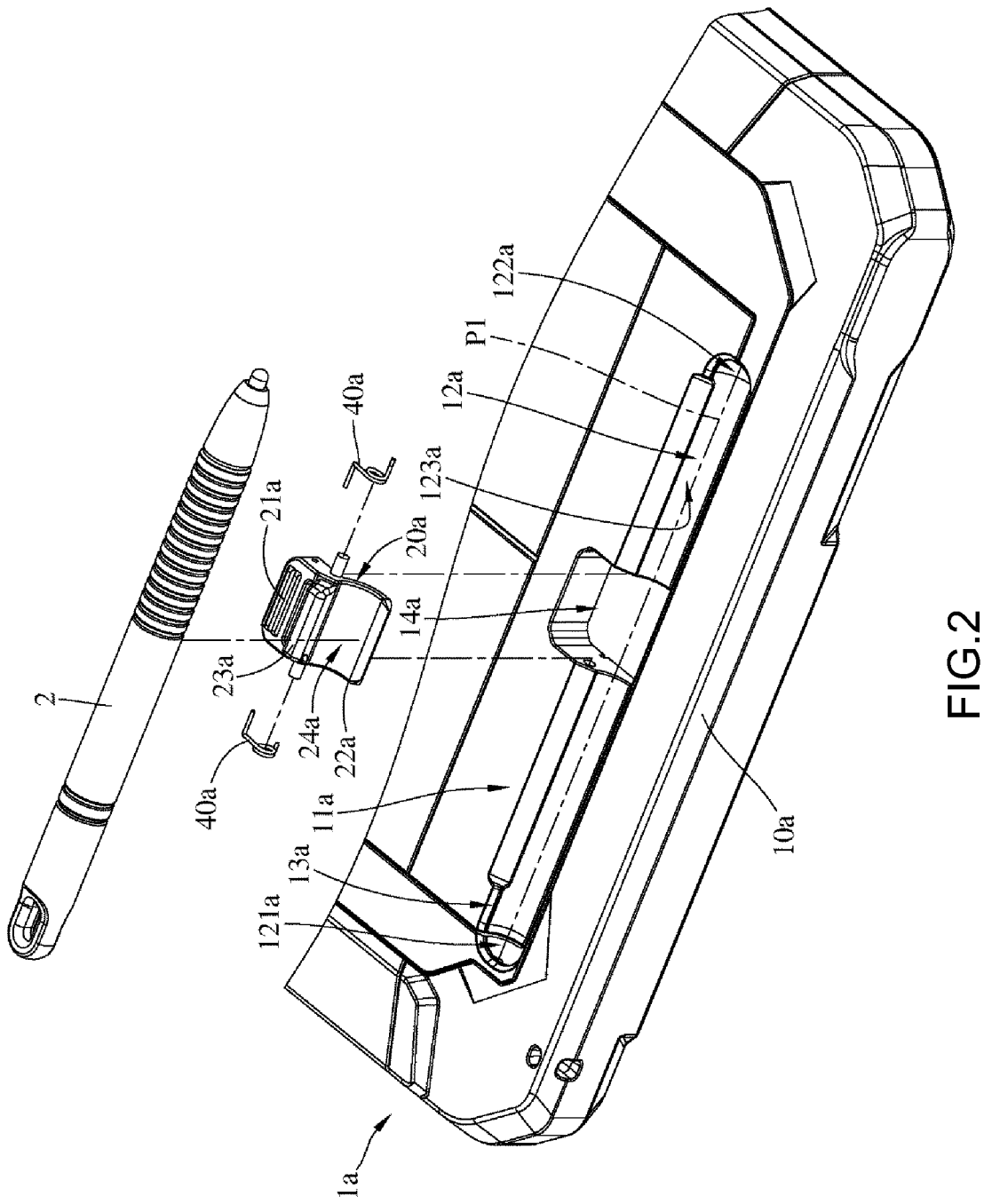
FIG. 2 is an exploded schematic diagram of FIG. 1.
Figure 3:
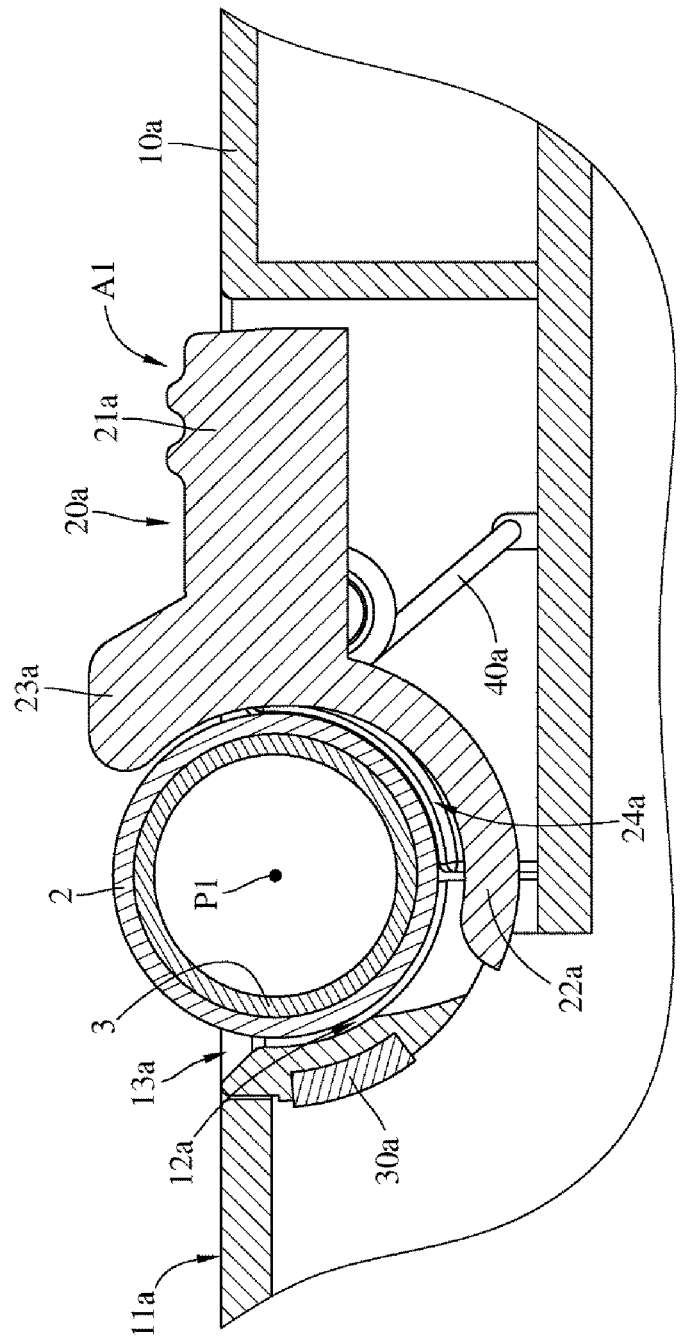
FIG. 3 is a cross-sectional schematic diagram of FIG. 1.

Refer to FIG. 1 to FIG. 3. FIG. 1 shows a three-dimensional schematic diagram of a casing assembly and a stylus disclosed according to a first embodiment of the present invention. FIG. 2 is an exploded schematic diagram of FIG. 1. FIG. 3 is a cross-sectional schematic diagram of FIG. 1.

In this embodiment, a casing assembly 1a is for accommodating a stylus 2. The casing assembly 1a includes a casing 10a and a button 20a. Moreover, the casing assembly 1a may further include a magnetic member 30a and two elastic members 40a.

The casing assembly 1a is, for example, a casing of an electronic device. The casing 10a is, for example but not limited to, a backplate of a tablet computer. The casing 10a has an outer surface 11a, an accommodation recess 12a and an opening 13a. The accommodation recess 12a is formed as being recessed from the outer surface 11a, and has a first end 121a and a second end 122a opposite to each other. The first end 121a and the second end 122a are respectively located on two opposite sides on a longitudinal axis P1 of the accommodation recess 12a. A plane where the opening 13a is located is, for example, coplanar with the outer surface 11a of the casing 10a, and the opening 13a extends from the first end 121a to the second end 122a of the accommodation recess 12a. The accommodation recess 12a is for accommodating the stylus 2.

In this embodiment, the plane where the opening 13a is located is not limited to being coplanar with the outer surface 11a of the casing 10a. In another embodiment, the plane where the opening is located may be non-coplanar with the outer surface of the casing, and may be, for example, higher than the outer surface of the casing.

The magnetic member 30a is, for example, embedded in the casing 10a, and is near the accommodation recess 12a. The magnetic member 30a is for magnetically attracting another magnetic member 3 disposed in the stylus 2, and hence magnetically fixes the stylus 2 in the accommodation recess 12a. The magnetic member 30a is not limited to being embedded in the casing 10a. In another embodiment, the magnetic member may be exposed from an inner wall surface of the accommodation recess. In yet another embodiment, the magnetic member may be omitted from the casing assembly.

In this embodiment, the casing 10a may further include a button slot 14a. The button slot 14a is formed as being recessed from an inner wall surface 123a of the accommodation recess 12a, and is located between the first end 121a and the second end 122a of the accommodation recess 12a. The button 20a includes an operation portion 21a, a pushing portion 22a and a stopping portion 23a. The pushing portion 22a and the stopping portion 23a are connected to two opposite sides of the operation portion 21a, respectively, and the operation portion 21a, the pushing portion 22a and the stopping portion 23a jointly form a groove 24a. The groove 24a is for collaborating with the accommodation recess 12a to accommodate the stylus 2. The operation portion 21a is in part located in the button slot 14a and the operation portion 21a is pivotally disposed at the casing 10a, and the pushing portion 22a is located in the accommodation recess 12a.

Figure 4:
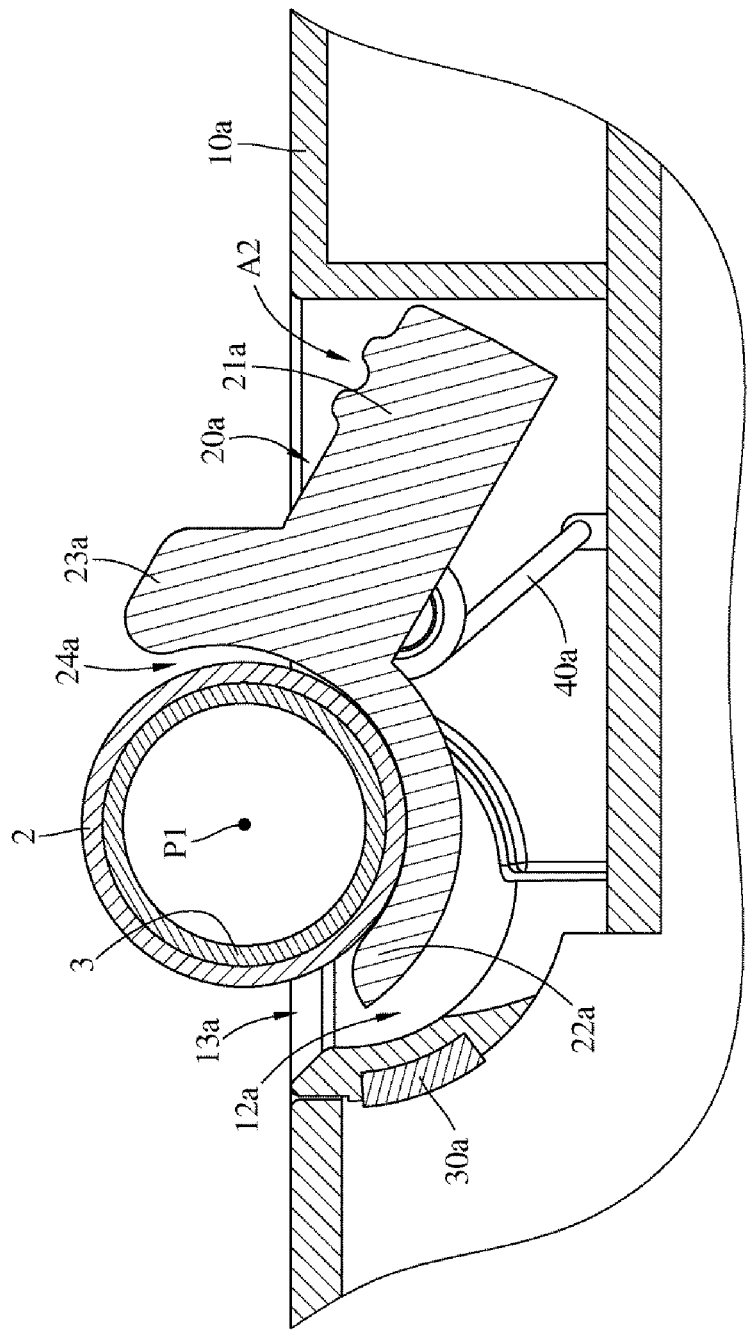
FIG. 4 is a cross-sectional schematic diagram of the stylus in FIG. 3 disengaged from the accommodation recess.

In this embodiment, the operation portion 21a is adapted to be pivotable between an initial position A1 (as shown in FIG. 3) and a released position A2 (as shown in FIG. 4). The two elastic members 40a are, for example, torsion springs. On of the elastic members 40a is disposed between one side of the operation portion 21a of the button 20a and the casing 10a, and the other elastic member 40a is disposed between the other side of the operation portion 21a of the button 20a and the casing 10a. The two elastic members 40a are for applying a force for pivoting the operation portion 21a from the released position A2 to the initial position A1.

As shown in FIG. 3, when the stylus 2 is accommodated in the accommodation recess 12a and the groove 24a and the operation portion 21a of the button 20a is located at the initial position A1, the pushing portion 22a is located on one side of the accommodation recess 12a away from the opening 13a, and the stopping portion 23a is located at the opening 13a and extends to be diagonally above the accommodation recess 12a, so as to limit the stylus 2 within the accommodation recess 12a.

Next, refer to FIG. 4. FIG. 4 shows a cross-sectional schematic diagram of the stylus in FIG. 3 disengaged from the accommodation recess.

As shown in FIG. 4, to take the stylus 2 out of the accommodation recess 12a, the operation portion 21a of the button 20a may be pressed by a finger, so that the operation portion 21a is pivoted from the initial position A1 to the released position A2. During the process of the operation portion 21a moving from the initial position A1 to the released position A2, the operation portion 21a causes the elastic members 40a to store an elastic restoring force, the stopping portion 23a is away from the opening 13a, and the pushing portion 22a moves from one side of the accommodation recess 12a away from the opening 13a toward the opening 13a. As such, the thrust of the pushing portion 22a of the button 20a overcomes the magnetic attraction force between the two magnetic members 30a and 3, and then pushes the stylus 2 (located in the accommodation recess 12a) out of the accommodation recess 12a, allowing the stylus 2 to be taken directly. Once the finger moves away from the button 20a, the elastic force of the elastic members 40a causes the operation portion 21a of the button 20a to return from the released position A2 to the initial position A1.

In this embodiment, the pushing portion 22a of the button 20a is enabled to push the stylus 2 out of the accommodation recess 12a by pressing the operation portion 21a of the button 20a. Thus, compared to a conventional approach of picking the stylus 2 by a finger, the design of operating the button 20a to withdraw the stylus 2 from the accommodation recess 12a provides a more convenient stylus pick-up operation. In particular, even when a user wears gloves, the user is still able to easily press the button 20a to push the stylus 2 out of the accommodation recess 12a and then directly take the stylus 2.

Moreover, the stylus 2 is pushed out of the accommodation recess 12a by the pushing portion 22a of the button 20a, in a direction substantially perpendicular to the longitudinal axis P1 of the accommodation recess 12a, but not in a direction of the longitudinal axis P1 of the accommodation recess 12a. Thus, it is not necessary for the accommodation recess 12a of the casing 10a to extend to the edge of the casing 10a, hence minimizing the influence of a reduced internal space of the casing 10a caused by the accommodation recess 12a provided and further benefiting the utilization of the internal space of the casing 10a.

Next, to place the stylus 2 back to the accommodation recess 12a, in a state where the operation portion 21a of the button 20a is at the released position A2, the stylus 2 is first placed in the groove 24a, and the stylus 2 is brought back to the accommodation recess 12a by the button 20a, while the operation portion 21a of the button 20a is pivoted back to the initial position A1 by the elastic force of the elastic members 40a. Alternatively, in a state where the operation portion 21a of the button 20a is at the initial position A1, the stylus 2 is directly fitted into the accommodation recess 12a and the groove 24a.

In this embodiment, when the button 20a is not pressed, the stylus 2 in the accommodation recess 12a is limited by the stopping portion 23a. Thus, even if the casing 10a receives an unexpected external impact (such as falling onto the ground), it is ensured that the stylus 2 does not disengage from the accommodation recess 12a.

In this embodiment, the number of the elastic members 40a is not limited to being two. In another embodiment, the casing assembly may include only one elastic member. In another embodiment, the elastic member may be omitted from the casing assembly. In such configuration, the button may be kept at the initial position by an appropriate structure or element when no external force is exerted thereon.

Figure 5:
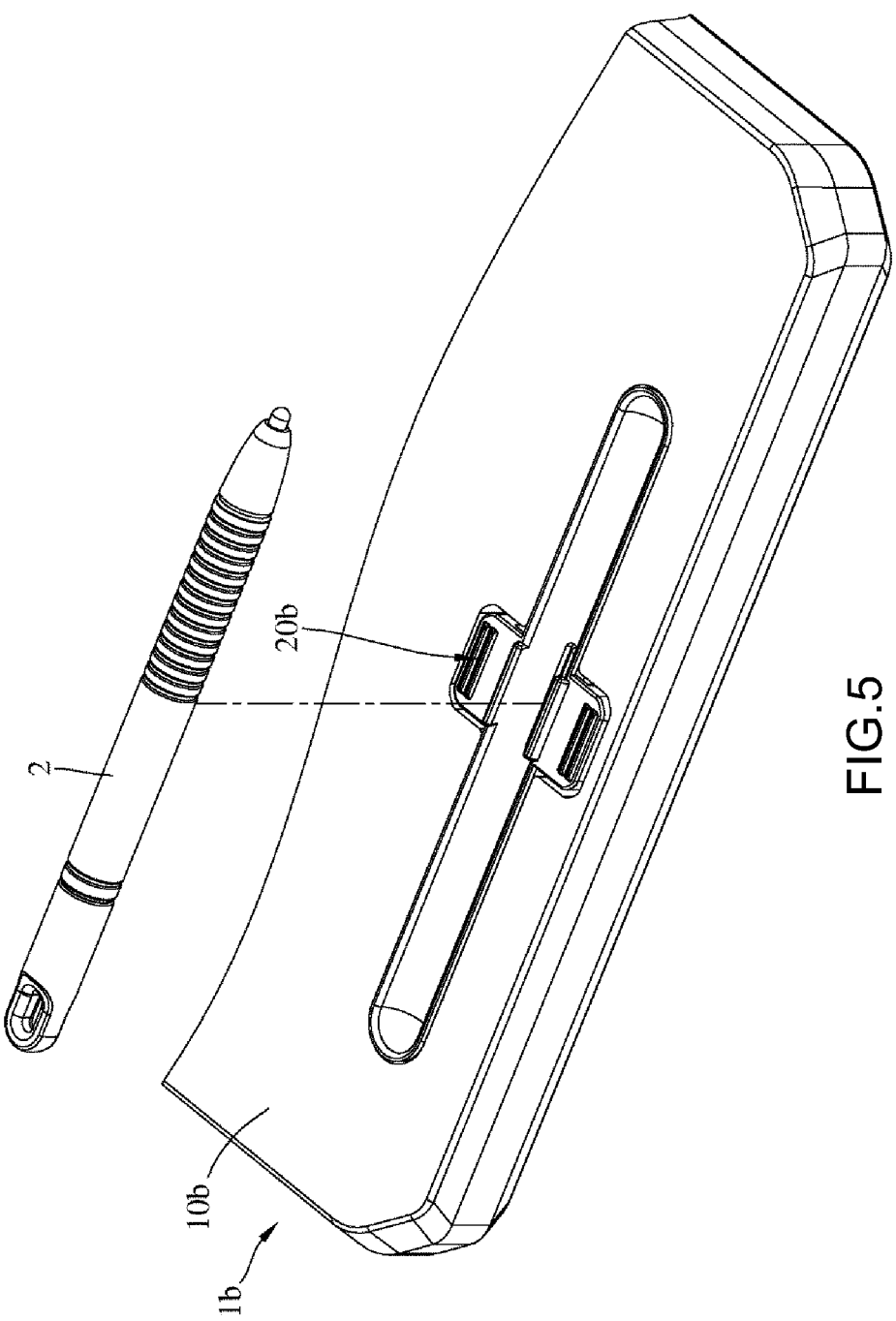
FIG. 5 is a three-dimensional schematic diagram of a casing assembly and a stylus disclosed according to a second embodiment of the present invention.
Figure 6:
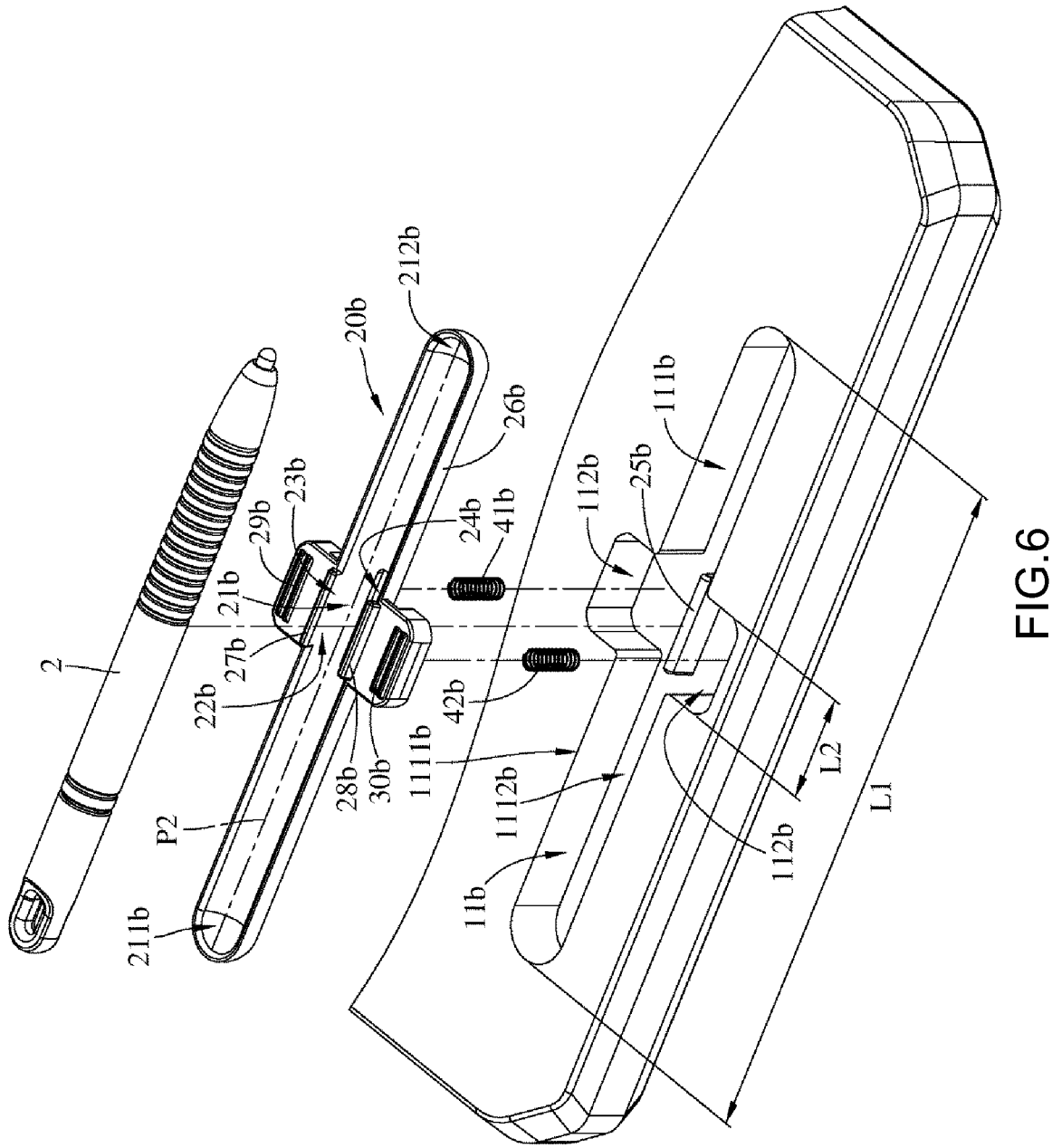
FIG. 6 is an exploded schematic diagram of FIG. 5.
Figure 7:
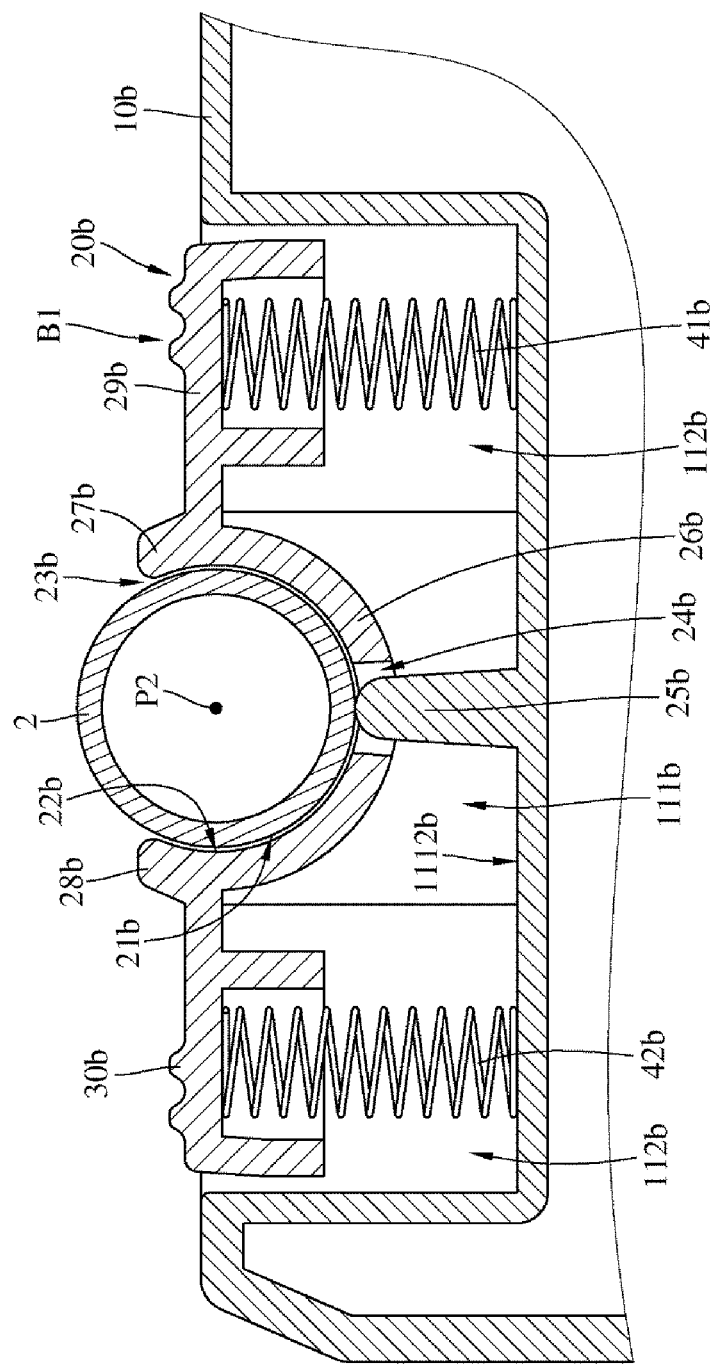
FIG. 7 is a cross-sectional schematic diagram of FIG. 5.

Next, refer to FIG. 5 to FIG. 7. FIG. 5 shows a three-dimensional schematic diagram of a casing assembly and a stylus disclosed according to a second embodiment of the present invention. FIG. 6 shows an exploded schematic diagram of FIG. 5. FIG. 7 shows a cross-sectional schematic diagram of FIG. 5.

In this embodiment, a casing assembly 1b is for accommodating a stylus 2. The casing assembly 1b includes a casing 10b and a button 20b. Moreover, the casing assembly 1b may further include two elastic members 41b and 42b.

The casing 10b is, for example, a backplate of a tablet computer. The casing 10b has a receiving slot 11b. The receiving slot 11b has, for example, a first receiving portion 111b and two second receiving portions 112b. The first receiving portion 111b is located between the two second receiving portions 112b, and is in communication with the two second receiving portions 112b. A length L1 of the first receiving portion 111b is greater than a length L2 of the two second receiving portions 112b.

The button 20b is movably disposed in the receiving slot 11b of the casing 10b. More specifically, the button 20b has an accommodation recess 21b, an arc inner wall surface 22b, an opening 23b, a through hole 24b and a pushing portion 25b. The accommodation recess 21b is formed by the arc inner wall surface 22b, and has a first end 211b and a second end 212b opposite to each other on a longitudinal axis P2 of the accommodation recess 21b. The opening 23b and the through hole 24b are located on two opposite sides of the accommodation recess 21b and are both in communication with the accommodation recess 21b, and the opening 23b extends from the first end 211b to the second end 212b. The accommodation recess 21b is for accommodating the stylus 2. The first receiving portion 111b of the receiving slot 11b has a slot opening 1111b and a slot bottom surface 1112b, wherein the slot bottom surface 1112b faces the slot opening 1111b. The pushing portion 25b is, for example, a column, and the pushing portion 25b is connected to the slot bottom surface 1112b of the first receiving portion 111b and is insertedly disposed in the through hole 24b.

Further, the button 20b includes a receiving portion 26b, a first stopping portion 27b, a second stopping portion 28b, a first operation portion 29b and a second operation portion 30b. The first stopping portion 27b and the first operation portion 29b are connected to one side of the receiving portion 26b, and extend toward different directions, respectively. The second stopping portion 28b and the second operation portion 30b are connected to the other side of the receiving portion 26b, and extend toward different directions, respectively. Different portions of the arc inner wall surface 22b forming the accommodation recess 21b are located at the receiving portion 26b, the first stopping portion 27b and the second stopping portion 28b, respectively. That is to say, the accommodation recess 21b is jointly formed by the receiving portion 26b, the first stopping portion 27b and the second stopping portion 28b. The receiving portion 26b is located at the first receiving portion 111b of the receiving slot 11b, and the first operation portion 29b and the second operation portion 30b are located at the two second receiving portions 112b of the receiving slot 11b, respectively.

Figure 8:
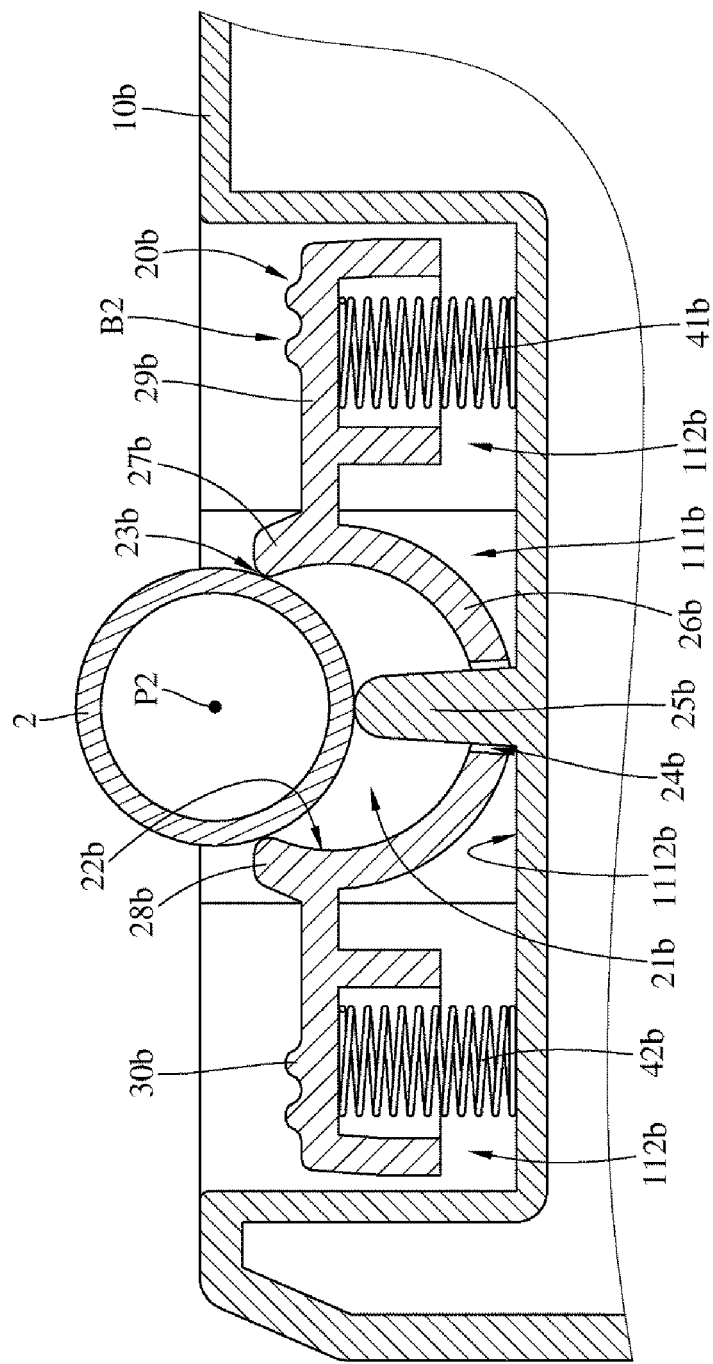
FIG. 8 is a cross-sectional schematic diagram of the stylus in FIG. 7 disengaged from the accommodation recess.

In this embodiment, the button 20b is adapted to be movable between an initial position B1 (as shown in FIG. 7) and a released position B2 (as shown in FIG. 8) relative to the casing 10b. The two elastic members 41b and 42b are, for example, compression springs. The two elastic members 41b and 42b are located at the two second receiving portions 112b of the receiving slot 11b, respectively, two opposite ends of the elastic member 41b are connected to the first operation portion 29b of the button 20b and the casing 10b, respectively, and two opposite ends of the elastic member 42b are connected to the second operation portion 30b of the button 20b and the casing 10b, respectively. The two elastic members 41b and 42b are for applying a force for moving the button 20b from the released position B2 to the initial position B1.

As shown in FIG. 7, when the button 20b is located at the initial position B1 and the stylus 2 is accommodated in the accommodation recess 21b, the stylus 2 is limited by the first stopping portion 27b and the second stopping portion 28b and is hence fixed in the accommodation recess 21b. At this time point, the pushing portion 25b of the button 20b is, for example, slightly protruding from the arc inner wall surface 22b of the button 20b, and is located on one side of the accommodation recess 21b away from the opening 23b.

Next, refer to FIG. 8. FIG. 8 shows a cross-sectional schematic diagram of the stylus in FIG. 7 disengaged from the accommodation recess.

To take the stylus 2 out of the accommodation recess 21b, the first operation portion 29b and the second operation portion 30b of the button 20b may be pressed by two fingers, such that the button 20b moves from the initial position B1 to the released position B2. During the process of the button 20b moving from the initial position B1 to the released position B2, the receiving portion 26b of the button 20b moves toward the slot bottom surface 1112b of the first receiving portion 111b of the casing 10b, such that the pushing portion 25b protrudes even more from the arc inner wall surface 22b and approaches the opening 23b of the button 20b along a radial direction of the arc inner wall surface 22b, and overcomes the limitation posed by the first stopping portion 27b and the second stopping portion 28b so further push the stylus 2 out of the accommodation recess 21b. When the fingers move away from the button 20b, the elastic force of the elastic members 41b and 42b causes the button 20b to return from the released position B2 to the initial position B1.

In this embodiment, the pushing portion 25b of the button 20b is enabled to push the stylus 2 out of the accommodation recess 21b by pressing the first operation portion 29b and the second operation portion 30b of the button 20b. Thus, compared to a conventional approach of picking the stylus 2 by a finger, the design of operating the button 20b to withdraw the stylus 2 from the accommodation recess 21b provides a more convenient stylus pick-up operation. In particular, even when a user wears gloves, the user is still able to easily press the button 20b to push the stylus 2 out of the accommodation recess 21b and then directly take the stylus 2.

Moreover, the stylus 2 is pushed out of the accommodation recess 21b by the pushing portion 25b of the button 20b, in a direction perpendicular to the longitudinal axis P2 of the accommodation recess 21b, but not in a direction of the longitudinal axis P2 of the accommodation recess 21b. Thus, it is not necessary for the accommodation recess 21b to extend to the edge of the casing 10b, hence minimizing the influence of a reduced internal space of the casing 10b caused by the accommodation recess 21b provided and further benefiting the utilization of the internal space of the casing 10b.

Next, to place the stylus 2 back to the accommodation recess 21b, in a state where the button 20b is at the initial position A1, the stylus 2 is directly fitted into the accommodation recess 21b of the button 20b.

In this embodiment, when the button 20b is not pressed, even if the casing 10b receives an unexpected external impact (such as falling onto the ground), it is ensured that the stylus 2 located in the accommodation recess 21b is still limited by the first stopping portion 27b and the second stopping portion 28b, and is kept in the accommodation recess 21b.

In this embodiment, the number of the elastic members 41b and 42b is two; however, the present invention is not limited thereto. In another embodiment, the casing assembly may include only one elastic member. In yet another embodiment, the elastic member may be omitted from the casing assembly.

When the button 20b is at the initial position B1, the pushing portion 25b is not limited to being slightly protruding from the arc inner wall surface 22b of the button 20b. In another embodiment, when the button is at the initial position B1, one end of the pushing portion may be aligned with the arc inner surface of the button or be withdrawn into the arc inner surface of the button.

In this embodiment, the button 20b has a through hole 24b for the pushing portion 25b to pass through; however, the present invention is not limited thereto. In another embodiment, the button may exclude such through hole. In such configuration, the pushing portion may be located next to one of the two opposite ends of the receiving portion of the button. When the button moves from the initial position to the released position, the pushing portion is still able to push the stylus out of the accommodation recess.

In this embodiment, the surface forming the accommodation recess 21b is the arc inner wall surface 22b; however, the present invention is not limited thereto. In another embodiment, the surface forming the accommodation recess may be a surface with angles and corners.

In this embodiment, the button 20b includes two operation portions (the first operation portion 29b and the second operation portion 30b); however, the present invention is not limited thereto. In another embodiment, the button may include only one operation portion.

In the casing assembly according to the embodiments above, the pushing portion of the button is enabled to push the stylus out of the accommodation recess by operating the operation portion(s) of the button. Thus, compared to a conventional approach of picking the stylus by a finger, the design of operating the button to withdraw the stylus from the accommodation recess provides a more convenient stylus pick-up operation. In particular, even when a user wears gloves, the user is still able to easily press the button to push the stylus out of the accommodation recess and then directly take the stylus.

In addition, when the button is not pressed, even if the casing receives an unexpected external impact (such as falling onto the ground), it is ensured that the stylus located in the accommodation recess is still limited by the stopping portion(s), and is kept in the accommodation recess.

Moreover, the stylus is pushed out of the accommodation recess by the pushing portion of the button, in a direction perpendicular to the longitudinal axis of the accommodation recess, but not in a direction of the longitudinal axis of the accommodation recess. Thus, it is not necessary for the accommodation recess to extend to the edge of the casing, hence minimizing the influence of a reduced internal space of the casing caused by the accommodation recess provided and further benefiting the utilization of the internal space of the casing.

Although the present invention is disclosed by way of the preferred embodiments above, the embodiments are not to be construed as limitations to the present invention. Without departing from the spirit and scope of the present invention, slight changes and modifications may be made by a person skilled in the art. Therefore, the scope of protection of the present invention shall be defined by the appended claims of the application.

What is claimed is:

1. A casing assembly for accommodating a stylus, comprising:
    a casing, having a receiving slot;
    a pushing portion, located on a slot bottom surface of the receiving slot; and
    a button, movably disposed in the receiving slot of the casing so as to be movable between an initial position and a released position, the button comprising an accommodation recess and an opening in communication with each other, the accommodation recess having a first end and a second end opposite to each other on a longitudinal axis of the accommodation recess, the opening extending from the first end to the second end, the accommodation recess being for accommodating the stylus;
    wherein the button further comprises a receiving portion, a first stopping portion, a second stopping portion and a first operation portion, the first stopping portion and the first operation portion are connected to one side of the receiving portion and extend toward different directions, respectively, the second stopping portion is connected to the other side of the receiving portion, and the receiving portion, the first stopping portion and the second stopping portion jointly form the accommodation recess with a through hole;
    wherein, when the button moves from the initial position to the released position, the pushing portion passes through the through hole so as to push the stylus out of the accommodation recess.

2. The casing assembly according to claim 1, wherein the button further comprises a second operation portion, and the second stopping portion and the second operation portion are connected to a same side of the receiving portion and extend toward different directions, respectively.

3. The casing assembly according to claim 1, further comprising:
    at least one elastic member, disposed at the button, for applying a force for moving the button from the released position to the initial position.

* * * * *